United States Patent
Oke et al.

(10) Patent No.: US 8,212,965 B2
(45) Date of Patent: Jul. 3, 2012

(54) LIQUID CRYSTAL DISPLAY DEVICE

(75) Inventors: Ryutaro Oke, Chiba (JP); Masashi Baba, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 190 days.

(21) Appl. No.: 12/708,984

(22) Filed: Feb. 19, 2010

(65) Prior Publication Data

US 2010/0208168 A1    Aug. 19, 2010

(30) Foreign Application Priority Data

Feb. 19, 2009    (JP) .................................. 2009-036277

(51) Int. Cl.
    *G02F 1/1335*    (2006.01)

(52) U.S. Cl. .......................................... 349/64; 349/61

(58) Field of Classification Search ............... 349/58–65
    See application file for complete search history.

(56) References Cited

U.S. PATENT DOCUMENTS

| 2005/0281050 | A1* | 12/2005 | Chou ............................ 362/612 |
| 2007/0258266 | A1  | 11/2007 | Baek et al. |
| 2010/0039579 | A1* | 2/2010  | Park et al. ....................... 349/58 |

FOREIGN PATENT DOCUMENTS

JP    2007-305584    11/2007

* cited by examiner

*Primary Examiner* — Dung T. Nguyen
(74) *Attorney, Agent, or Firm* — Antonelli, Terry, Stout & Kraus, LLP.

(57) ABSTRACT

The present invention provides a liquid crystal display device which can reduce the number of cables so as to prevent the occurrence of the brightness irregularities. The liquid crystal display device includes a liquid crystal display panel and a backlight. The backlight includes an LED substrate on which a plurality of LEDs are mounted, a reflection sheet which is arranged on the LED substrate, a diffusion plate which is arranged in a spaced-apart manner from the LED substrate, side supports which support the diffusion plate at end portions of the LED substrate, connectors which are provided for electrical connection with an external device, and electronic parts which are electrically connected with at least one of these LEDs. The connectors and the electronic parts are mounted on the LED substrate below the side supports. The side supports exhibit higher light reflectance than the connectors and the electronic parts.

2 Claims, 3 Drawing Sheets

LIQUID CRYSTAL DISPLAY DEVICE

The present application claims priority from Japanese application JP 2009-036277 filed on Feb. 19, 2009, the content of which is hereby incorporated by reference into this application.

BACKGROUND OF THE INVENTION

1. Field of the Invention

The present invention relates to a liquid crystal display device.

2. Background Art

There has been known a liquid crystal display device which uses LEDs (Light Emitting Diodes) as a light source of a backlight thereof (JP-A-2007-305584 (patent document 1) (relevant US patent application; US2007/0258266)). Conventionally, a substrate on which a plurality of LEDs are mounted and a substrate on which parts constituting a drive circuit, a power source circuit, a protection circuit and the like are mounted are connected with each other by cables.

SUMMARY OF THE INVENTION

It is often the case where a plurality of LEDs are divided into a plurality of groups on a substrate. In such a case, it is necessary to provide a drive circuit and the like for every group and hence, the number of cables is increased. This increase of the number of cables not only increases a burden on a connection operation but also requires a space thus impeding the miniaturization of the liquid crystal display device.

Further, even when various parts are mounted on the substrate on which the LEDs are mounted, these parts exhibit low light reflectance and hence, there arises a drawback that brightness irregularities occur.

It is an object of the present invention to provide a liquid crystal display device which can reduce the number of cables thus preventing the occurrence of the brightness irregularities.

(1) The present invention is directed to a liquid crystal display device which includes: a liquid crystal display panel; and a backlight which includes an LED substrate on which a plurality of LEDs are mounted, a reflection sheet which is arranged on the LED substrate, a diffusion plate which is arranged in a spaced-apart manner from the LED substrate, side supports which support the diffusion plate at end portions of the LED substrate, connectors which are provided for electrical connection with an external device, and electronic parts which are electrically connected with at least one of these LEDs, wherein the connectors and the electronic parts are mounted on the LED substrate below the side supports, and the side supports exhibit higher light reflectance than the connectors and the electronic parts. According to the present invention, the connectors and the electronic parts are arranged below the side support and hence, it is possible to prevent the occurrence of brightness irregularities attributed to the low reflectance. Further, the connectors and the electronic parts are mounted on the LED substrate and hence, the number of cables can be reduced.

(2) In the liquid crystal display device having the constitution (1), the backlight may further include a lower frame which is arranged on a surface of the LED substrate opposite to a surface of the LED substrate on which the plurality of LEDs are arranged, a first sheet which is interposed between a first region of the LED substrate where the plurality of LEDs are mounted and the lower frame, and a second sheet which is interposed between a second region of the LED substrate where the connectors and the electronic parts are mounted and the lower frame, and the second sheet may exhibit higher thermal conductivity than the first sheet.

DESCRIPTION OF THE PREFERRED EMBODIMENT

Hereinafter, a liquid crystal display device according to an embodiment of the present invention is explained in conjunction with drawings.

Figure 1:
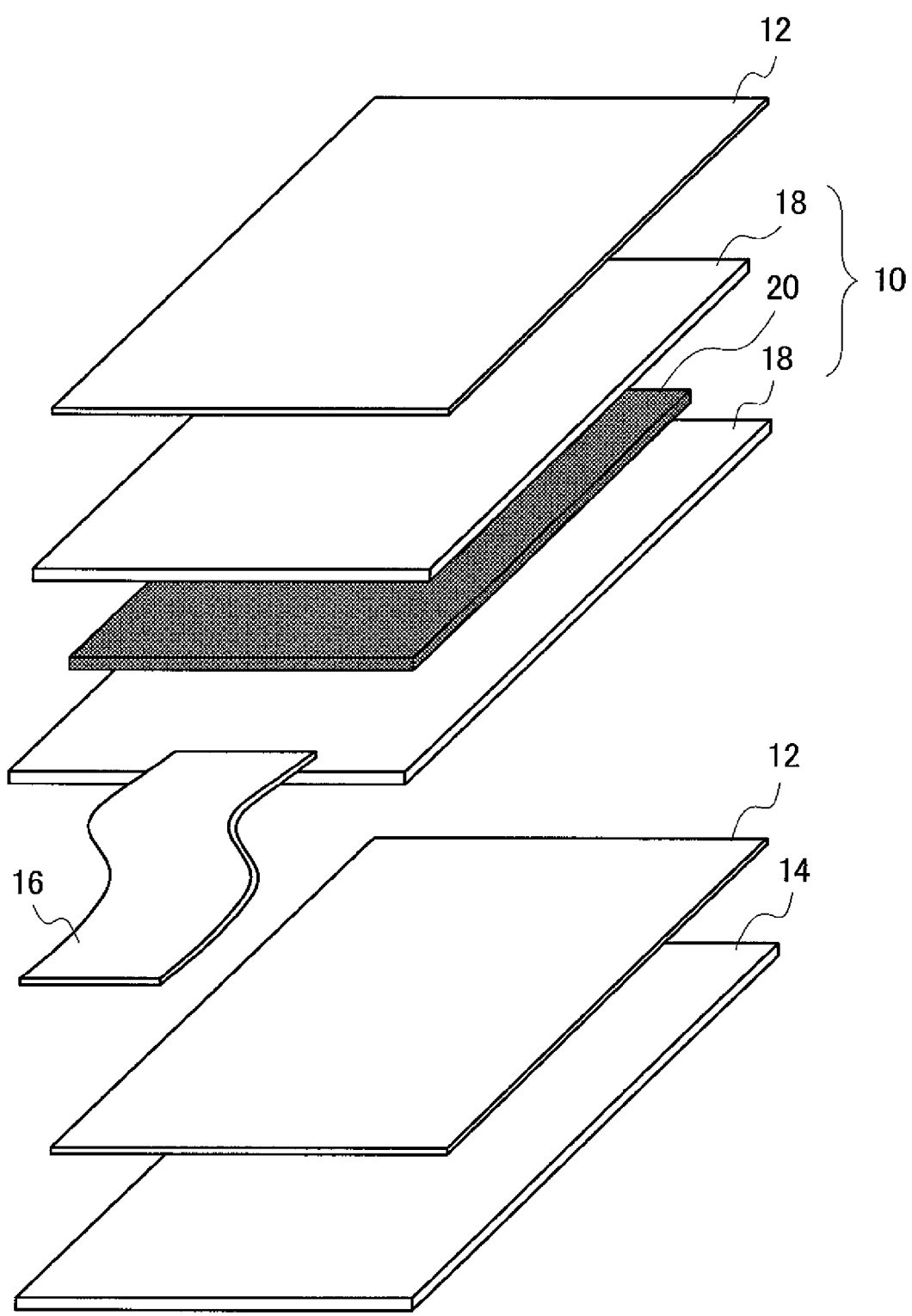
FIG. 1 is an exploded perspective view of a liquid crystal display device according to an embodiment of the present invention.

FIG. 1 is an exploded perspective view of a liquid crystal display device according to an embodiment of the present invention. The liquid crystal display device includes a liquid crystal display panel 10. Polarizers 12 are arranged on both surfaces of the liquid crystal display panel 10 respectively. The liquid crystal display device includes a backlight 14. One of polarizers 12 is interposed between the liquid crystal display panel 10 and the backlight 14. A flexible printed circuit board 16 is mounted on the liquid crystal display panel 10.

The liquid crystal display panel 10 includes a pair of substrates 18, and liquid crystal 20 is interposed between both substrates 18. One substrate 18 is a TFT (Thin Film Transistor) substrate (or an array substrate) which includes thin film field effect transistors, pixel electrodes, lines and the like, while the other substrate 18 is a color filter substrate.

As a drive method of the liquid crystal display panel 10, any method such as an IPS (In Plane Switching) method, a TN (Twisted Nematic) method or a VA (Vertical Alignment) method may be used. The electrodes and lines are formed corresponding to the adopted drive method.

Figure 2:
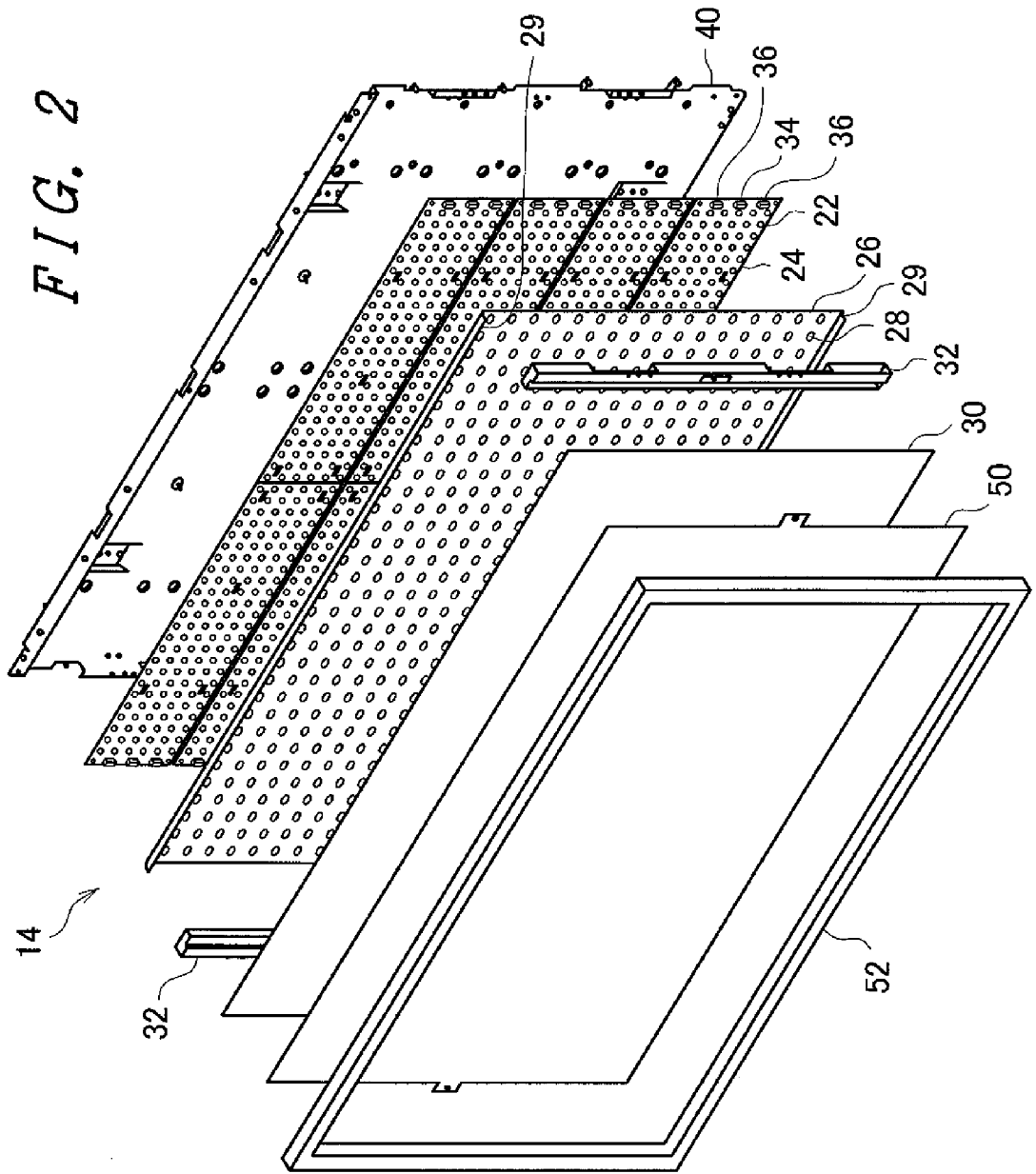
FIG. 2 is an exploded perspective view of a backlight of the liquid crystal display device.
Figure 3:
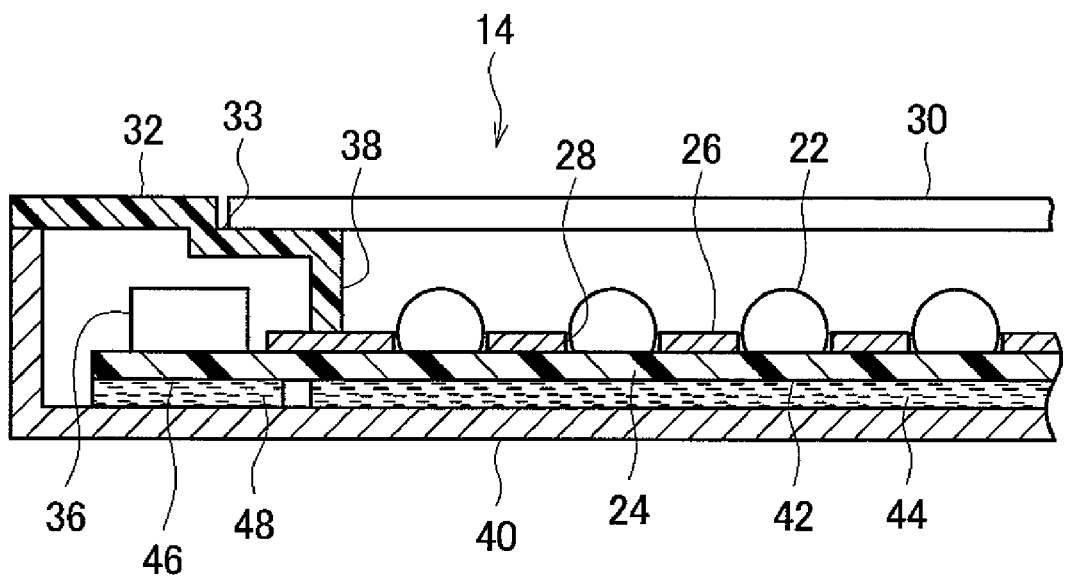
FIG. 3 is a schematic cross-sectional view of the backlight.

FIG. 2 is an exploded perspective view of the backlight. FIG. 3 is a schematic cross-sectional view of the backlight.

The backlight 14 includes an LED substrate 24 on which a plurality of LEDs 22 are mounted. A plurality of LEDs 22 constitute a light source. The plurality of LEDs 22 are divided into a plurality of groups, and two or more LEDs 22 are connected in series in each group. Accordingly, the brightness of the LEDs 22 can be adjusted to differ at every group. On the other hand, by applying different voltages to respective groups corresponding to the difference in characteristics of LEDs 22 in respective groups, the brightness of the LEDs 22 of all groups may be set uniform.

A reflection sheet 26 is arranged on the LED substrate 24. A plurality of holes 28 are formed in the reflection sheet 26, and the plurality of LEDs 22 are inserted into the plurality of holes 28 respectively. The reflection sheet 26 exhibits light reflectance higher than light reflectance of a surface of the LED substrate 24, and reflects light radiated from the LEDs 22. Further, as shown in FIG. 2, the reflection sheet 26 is bent at edge portions thereof thus forming raised portions 29 which are raised from the LED substrate 24 while avoiding portions corresponding to the side supports 32. The raised portions 29 reflect and return light which is directed in the direction parallel to the reflection sheet 26.

A diffusion plate 30 is arranged in a spaced-apart manner from the LED substrate 24 (see FIG. 3). The diffusion plate 30 is provided for reducing brightness irregularities by diffusing light radiated from the LEDs 22. The diffusion plate 30 is supported on the side supports 32 at end portions (to be more specific, a pair of opposing end portions) of the LED substrate 24. The side supports 32 are formed of a resin molded product, and are also referred to as side molds. Each side support 32 has a stepped portion 33 on an upper surface thereof, and the diffusion plate 30 can be positioned by such stepped portions 33 of the side supports 32 (To be more specific, the diffusion plate 30 is positioned in the direction along a surface of the diffusion plate 30 and also in the direction toward the side supports 32).

Connectors 34 for establishing the electrical connection between the liquid crystal display device and an external device are mounted on the LED substrate 24. One connector 34 corresponds to one group of the LEDs 22, and a plurality of connectors 34 are mounted on the LED substrate 24. Further, electronic parts 36 each of which is electrically connected with at least one LED 22 are mounted on the LED substrate 24. The electronic part 36 is, for example, a diode, an IC chip or the like. The electronic part 36 constitutes a drive circuit, a protection circuit, a smoothing circuit, a voltage conversion circuit and the like for the LEDs 22. The connectors 34 and the electronic parts 36 are mounted on the LED substrate 24 and hence, the number of cables can be reduced. At least one electronic part 36 corresponds to one group of the LEDs 22, and a plurality of electronic parts 36 are mounted on the LED substrate 24.

The side support 32 exhibits light reflectance higher than light reflectance of the connector 34 and light reflectance of the electronic parts 36. For example, while the connectors 34 and the electronic parts 36 are colored in black, the side supports 32 are colored in white thus allowing the side supports 32 to perform diffusion reflection. The connectors 34 and the electronic parts 36 are mounted on the LED substrate 24 below the side support 32. The connectors 34 and the electronic parts 36 are separated from the LEDs 22 by a portion of the side support 32 thus preventing the reflection of light from the side on the connectors 34 and the electronic parts 36. That is, a raised surface 38 of the side supports 32 on an LED 22 side is formed so as to reflect and return light which is directed in the direction parallel to the reflection sheet 26. Further, the connectors 34 and the electronic parts 36 are covered with a portion of the side support 32 thus also preventing the reflection of light from above on the connectors 34 and the electronic parts 36.

According to the embodiment, the connectors 34 and the electronic parts 36 are arranged below the side supports 32 and hence, it is possible to prevent the occurrence of brightness irregularities attributed to the low reflectance.

The backlight 14 includes a lower frame 40. The side supports 32 also function as reinforcing members for the lower frame 40. The lower frame 40 is arranged on a surface of the LED substrate 24 opposite to a surface of the LED substrate 24 on which the plurality of LEDs 22 are mounted. A first sheet 44 is interposed between the lower frame 40 and a first region 42 of the LED substrate 24 where the plurality of LEDs 22 are mounted. A second sheet 48 is interposed between the lower frame 40 and a second region 46 of the LED substrate 24 where the connectors 34 and the electronic parts 36 are mounted. The first sheet 44 and the second sheet 48 may be respectively formed of a pressure-sensitive adhesive double-coated sheet.

In this embodiment, the second sheet 48 exhibits higher thermal conductivity than the first sheet 44. Accordingly, heat generated in the electronic parts 36 whose temperature is liable to become higher than a temperature of the LEDs 22 can be efficiently released to the lower frame 40. Since the lower frame 40 also functions as a radiator, the radiation property of the lower frame 40 may be enhanced by forming the lower frame 40 using metal.

Further, the backlight 14 includes an optical sheet 50 which overlaps with the diffusion plate 30. The backlight 14 also includes an upper frame 52, and a display region is formed on an inner side of the upper frame 52. Between the upper frame 52 and the lower frame 40, the optical sheet 50, the diffusion sheet 30, the side supports 32, the reflection sheet 26 and the LED substrate 24 are arranged.

The present invention is not limited to the above-mentioned embodiment, and various modifications of the present invention are conceivable. For example, the constitution explained in conjunction with the embodiment may be replaced with the constitution which is substantially equal to the constitution explained in conjunction with the embodiment, the constitution which acquires the same manner of operation and advantageous effects as the constitution explained in conjunction with the embodiment or the constitution which can achieve the same object as the present invention.

What is claimed is:

1. A liquid crystal display device comprising:
   a liquid crystal display panel; and
   a backlight which includes an LED substrate on which a plurality of LEDs are mounted, a reflection sheet which is arranged on the LED substrate, a diffusion plate which is arranged in a spaced-apart manner from the LED substrate, side supports which support the diffusion plate at end portions of the LED substrate, connectors which are provided for electrical connection with an external device, and electronic parts which are electrically connected with at least one of said LEDs, wherein
   the connectors and the electronic parts are mounted on the LED substrate below the side supports, and
   the side supports exhibit higher light reflectance than the connectors and the electronic parts.

2. A liquid crystal display device according to claim 1, wherein
   the backlight further includes a lower frame which is arranged on a surface of the LED substrate opposite to a surface of the LED substrate on which the plurality of LEDs are arranged, a first sheet which is interposed between a first region of the LED substrate where the plurality of LEDs are mounted and the lower frame, and a second sheet which is interposed between a second region of the LED substrate where the connectors and the electronic parts are mounted and the lower frame, and
   the second sheet exhibits higher thermal conductivity than the first sheet.

* * * * *